(12) United States Patent
Al Za'noun et al.

(10) Patent No.: US 8,984,360 B2
(45) Date of Patent: Mar. 17, 2015

(54) DATA QUALITY ANALYSIS AND MANAGEMENT SYSTEM

(75) Inventors: Ashraf Al Za'noun, Raleigh, NC (US); Lisa Wilson, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 132 days.

(21) Appl. No.: 13/601,729

(22) Filed: Aug. 31, 2012

(65) Prior Publication Data

US 2013/0055042 A1  Feb. 28, 2013

Related U.S. Application Data

(60) Provisional application No. 61/529,818, filed on Aug. 31, 2011.

(51) Int. Cl.
G06F 11/00 (2006.01)
G06Q 10/06 (2012.01)

(52) U.S. Cl.
CPC .............................. *G06Q 10/06395* (2013.01)
USPC ......................................... 714/746; 714/701

(58) Field of Classification Search
CPC ..................... G06Q 10/06395; G06Q 10/06
USPC ........... 709/225; 706/54; 705/7, 10; 707/722, 707/690, 625; 714/746, 54, 701
See application file for complete search history.

(56) References Cited

U.S. PATENT DOCUMENTS

| | | | |
|---|---|---|---|
| 7,251,693 B2* | 7/2007 | Stull et al. | 709/225 |
| 8,645,309 B2* | 2/2014 | Golab et al. | 706/54 |
| 2005/0066240 A1 | 3/2005 | Sykes et al. | |
| 2007/0198312 A1* | 8/2007 | Bagchi et al. | 705/7 |
| 2010/0005346 A1 | 1/2010 | Hamlescher et al. | |
| 2010/0070893 A1 | 3/2010 | Schreck et al. | |
| 2010/0169166 A1* | 7/2010 | Bateni et al. | 705/10 |
| 2011/0055205 A1* | 3/2011 | Scott et al. | 707/722 |
| 2012/0150820 A1* | 6/2012 | Sankaranarayanan et al. | 707/690 |
| 2013/0006931 A1* | 1/2013 | Nelke et al. | 707/625 |

OTHER PUBLICATIONS

Maletic, J.I. et al., "Data Cleansing: Beyond Integrity Analysis", Proceedings of the Conference on Information Quality, Jun. 2000.

* cited by examiner

*Primary Examiner* — David Ton
(74) *Attorney, Agent, or Firm* — Mannava & Kang, P.C.

(57) ABSTRACT

A data quality analysis and management system includes a data quality testing module to perform data quality tests on received data and determine data quality statistics from the execution of the data quality tests. The system also includes a data quality analysis and management engine to determine data quality cost metrics including cost of setup, cost of execution, internal data cost, and external data cost, and calculate a cost of data quality from the data quality cost metrics, and a reporting module to generate a data quality scorecard including statistics determined from execution of the data quality tests by the data quality testing module and the cost of data quality determined by the data quality analysis and management engine.

20 Claims, 14 Drawing Sheets

601 → Cost of Data Quality = Conformance + Non Conformance

602 → Cost of Data Quality = $\Sigma$ (Cost of Setup + Cost of Execution) + Internal Data Cost $\Sigma$ (Business Remedy Cost + IT Remedy Cost) + External Data $\Sigma$ (Business Remedy Cost + IT Remedy Cost + External Data Support and Communication)

FIG. 6

Data Quality Cost by Man Hour

|  | Tier 1 | Tier 2 | Tier 3 |
|---|---|---|---|
| Cost of Setup | 16 | 40 | 60 |
| Cost of Execution | 2 | 4 | 8 |
| Business Remedy Cost | 16 | 40 | 60 |
| IT Remedy Cost | 2 | 8 | 16 |
| External Data Support and Communication | 24 | 40 | 60 |
| Total | 60 | 132 | 204 |

Data Quality Scorecard
Period 1-20-2007 -- 1-27-2007

| Capability | Application | Severity | Category | Monetization (Max Hour x 1098 Blended Rate) | Total Successful | Total Rejected | Rejection % | Target Rejection % | Difference | Trend Indicator |
|---|---|---|---|---|---|---|---|---|---|---|
| Retail | | | | | | | | | | |
| | App | Low | Completeness | | 900 | 100 | 10% | 20% | -10% | UP |
| | | High | Correctness | | 1,800 | 200 | 10% | 20% | -10% | UP |
| | | Low | Referential Integrity | | 2,000 | 300 | 13% | 20% | -7% | UP |
| | Traffic Light | | | $7,412.00 | | | | | | |
| Supply Chain | | | | | | | | | | |
| | App | Low | Completeness | | 900 | 100 | 10% | 5% | 5% | DOWN |
| | | High | Correctness | | 1,800 | 200 | 10% | 5% | 5% | DOWN |
| | | Low | Correctness | | 1,800 | 200 | 10% | 5% | 5% | DOWN |
| | | Low | Referential Integrity | | 300 | 300 | 50% | 5% | 45% | UP |
| | Space Management | Low | Completeness | $65,400.00 | 900 | 100 | 10% | 5% | 5% | DOWN |
| | | High | Correctness | | 1,800 | 200 | 10% | 5% | 5% | DOWN |
| | | Low | Correctness | | 1,000 | 200 | 17% | 5% | 12% | DOWN |
| | | Low | Referential Integrity | | 600 | 300 | 33% | 5% | 28% | DOWN |
| | Traffic Light | | | $54,500.00 | | | | | | |
| Corporate | | | | | | | | | | |
| | App | Low | Completeness | | 900 | 100 | 10% | 20% | -10% | UP |
| | | High | Correctness | | 1,800 | 200 | 10% | 20% | -10% | UP |
| | | Low | Referential Integrity | | 0 | 300 | 0% | 20% | -10% | UP |
| | Traffic Light | | | $7,412.00 | | | | | | |
| Services | | | | | | | | | | |
| | App | Low | Completeness | | 900 | 100 | 10% | 20% | -10% | UP |
| | | High | Correctness | | 1,800 | 200 | 10% | 20% | -10% | UP |
| | | Low | Referential Integrity | | 2,700 | 300 | 10% | 20% | -10% | UP |
| | Traffic Light | | | $32,700.00 | | | | | | |
| | Total Completeness | | | | 3,600 | 200 | 5% | 10% | -5% | UP |
| | Total Correctness | | | | 9,000 | 400 | 4% | 10% | -6% | UP |
| | Total Refential Integrity | | | | 5,000 | 600 | 11% | 10% | 1% | UP |
| | TOTAL | | | | 17,600 | 1,200 | 6% | 10% | -4% | UP |
| | Traffic Light | | | $167,424.00 | | | | | | |

FIG. 8

| No. | DQ Type | DQ Checks | DQA Log | Load Target Action | Continue Process Action | Where to check |
|---|---|---|---|---|---|---|
| 1 | Referential Integrity | Primary Keys | Yes | No | Reject this record, process next | As part of Load process |
| 2 | Completeness | Mandatory Keys | Yes | No | Reject this record, process next | As part of Load process |
| 3 | Completeness | Row Count | Yes | Yes | Yes | As part of Load process |
| 4 | Referential Integrity | Foreign Keys | Yes | Yes | Yes | As part of Load process |
| 5 | Accuracy | Ranges | Yes | Yes, if the column size fits data | Yes | As part of Load process |
| 6 | Accuracy | Business Rule | Yes | Yes, if the column size fits data | Yes | As part of Load process |
| 7 | Conformity | Business Rule | Yes | Yes, if the column size fits data | Yes | As part of Load process |
| 8 | Conformity | Business Rule | Yes | Yes, if the column size fits data | Yes | As part of Load process |
| 9 | Referential Integrity | Duplicity | Yes | No | Reject this record, process next | As part of Load process |

FIG. 13B

DATA QUALITY ANALYSIS AND MANAGEMENT SYSTEM

PRIORITY

The present application claims priority to U.S. Provisional Patent Application Ser. No. 61/529,818, filed on Aug. 31, 2011, which is incorporated by reference in its entirety.

BACKGROUND

Data quality may relate to the accuracy of data and whether the proper data is being captured to meet the user's needs and whether the data is available when it is needed. Data quality may be important for a variety of reasons. For example, in a chemical or pharmaceutical manufacturing scenario, data quality may be important to accurately determine the amount of active ingredients in raw stock which impacts the chemical or pharmaceutical manufactured from the raw stock. In another scenario, inventory data quality may be important to ensure the proper amount of raw stock is delivered and available to produce a certain amount of chemical. In another scenario, data quality may be important for ensuring regulatory compliance. Sarbanes-Oxley and other government regulations may require an organization to maintain strict records and provide accurate reports. Failure to comply may result in harsh penalties. In another example, data quality may be important for making accurate predictions. For example, predictions regarding the weather or predictions regarding the stock market may be impacted by the quality of the data used to make the predictions. In some cases, data must be available in a timely manner and the level of data integrity must be high to perform daily operations and to ensure reactions and decisions based on the data are justified.

Given the large amounts of data that may be generated, and in some cases the requirements for accessing the data in a short time frame, it is often difficult to measure and monitor data accuracy. Furthermore, even if data accuracy were to be monitored, it is often difficult to implement fixes for inaccurate data in a timely manner.

SUMMARY

According to an embodiment, a data quality analysis and management system may include an application service integration and communication interface to interface with internal and external systems to receive data. The system may include a data quality testing module, which may be executed by a processor, to perform data quality tests on the received data and to determine data quality statistics from the execution of the data quality tests, which may include data quality tests for completeness, conformity, consistency, integrity and duplicity tests. The system may include an error handler to execute remedial operations in response to data quality errors detected by the data quality testing module, and the data quality testing module can execute the completeness and the conformity tests in a first stage of data quality testing and the error handler can perform data cleansing based at least on the conformity test. The data quality testing module may execute the consistency, the integrity and the duplicity tests on the cleansed data in a second stage. The system may include a data quality analysis and management engine to determine data quality cost metrics including cost of setup, cost of execution, internal data cost, and external data cost, and calculate a cost of data quality from the data quality cost metrics. The system may also include a reporting module to generate a data quality scorecard including statistics determined from execution of the data quality tests by the data quality testing module and the cost of data quality determined by the data quality analysis and management engine.

According to an embodiment, a method of performing data quality analysis and management includes executing, by a processor, data quality tests on records received from a plurality data sources, wherein the data quality tests include completeness, conformity, consistency, integrity and duplicity tests, and wherein the execution of the data quality tests includes executing the completeness and the conformity tests in a first stage and performing data cleansing based at least on the conformity test, and executing the consistency, the integrity and the duplicity tests on the cleansed data in a second stage and loading the records in a database table. The method may also include determining data quality cost metrics including cost of setup, cost of execution, internal data cost, and external data cost, and calculating a cost of data quality from the data quality cost metrics, wherein the cost of data quality calculated by the data quality analysis and management engine equals ((cost of setup+cost of execution)+(internal data cost+external data cost)). The internal data cost equals (business remedy cost+information technology remedy cost), and the external data cost equals (the business remedy cost+the information technology remedy cost+external data support and communication cost). The method may further include generating a data quality scorecard including statistics determined from execution of the data quality tests and the cost of data quality.

According to an embodiment, the methods and systems described herein may include machine readable instructions that are executable by a processor to perform the methods and execute the functions of the system.

BRIEF DESCRIPTION OF THE DRAWINGS

The embodiments are described in detail in the following description with reference to the following figures. The figures illustrate examples of the embodiments.

FIG. 6 illustrates an equation for calculating the cost of data quality.

FIG. 7 illustrates data quality costs by tier.

FIG. 8 illustrates a data quality scorecard.

FIG. 13B illustrates data quality tests and remedial operations.

DETAILED DESCRIPTION OF EMBODIMENTS

Figure 1:
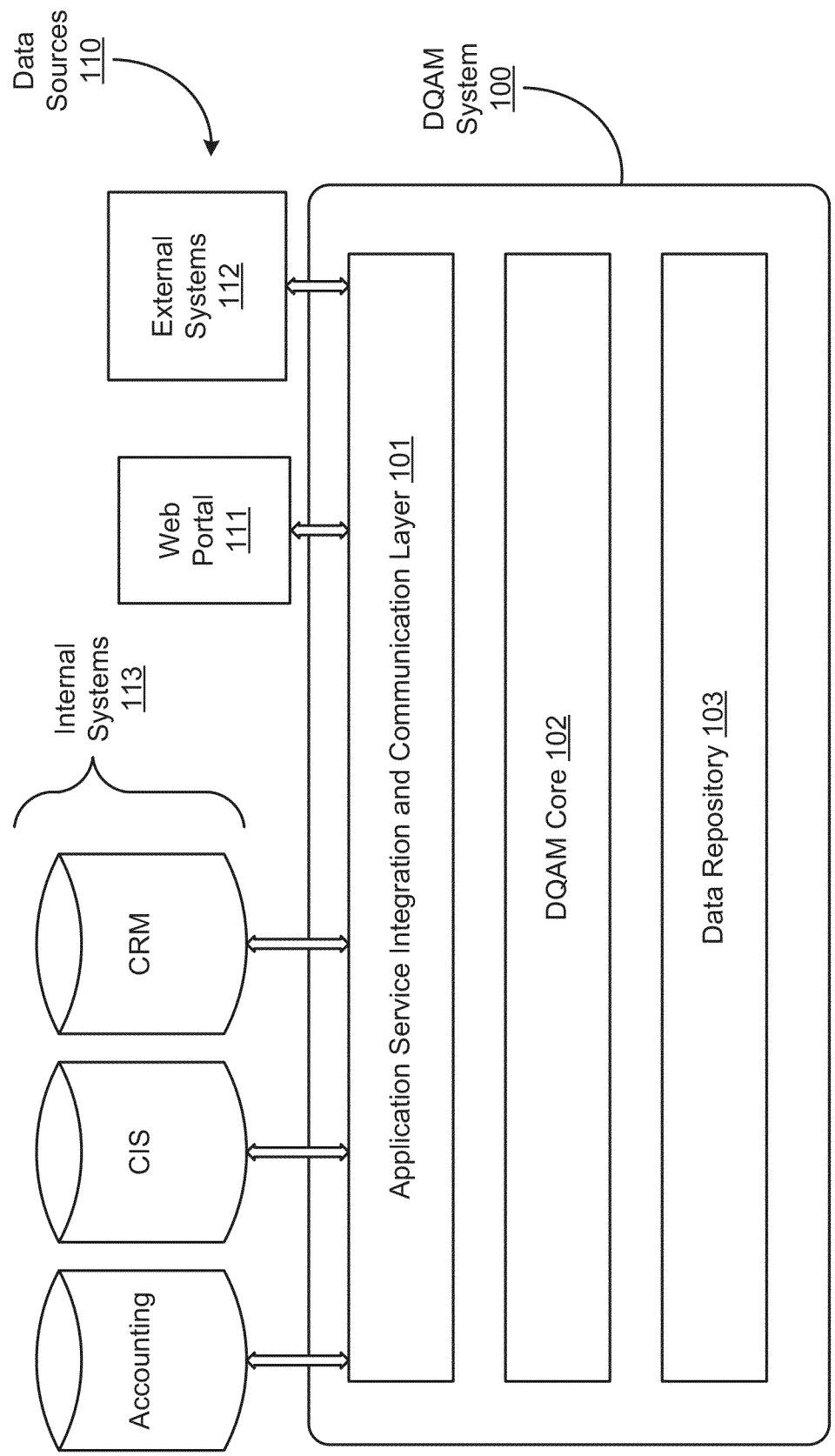
FIG. 1 illustrates a data quality analysis and management system.

For simplicity and illustrative purposes, the embodiments of the invention are described by referring mainly to examples thereof. Also, numerous specific details are set forth in order to provide a thorough understanding of the embodiments. It will be apparent however, to one of ordinary skill in the art, that the embodiments may be practiced without limitation to one or more of these specific details. In some instances, well known methods and structures have not been described in detail so as not to unnecessarily obscure the description of the embodiments.

According to an embodiment, a data quality analysis and management (DQAM) system is operable to monitor, test, and manage data quality. Data quality may be determined based on whether the data satisfies technical requirements, business requirements and is fit for the user's needs. Business requirements may include business rules for the data, and technical requirements may include requirements for applications to use the data, such as proper syntax, does the data fall within predetermined data ranges, are the required fields populated, etc. Data quality may be determined based on classification in tiers. Each tier may have different data quality metrics that are measured for the phase and different thresholds for determining whether the quality is sufficient. Examples of phases may include a data capture phase, a data processing phase and a data application phase. Also, the data quality management system may prioritize data into different tiers according to importance to the user, and different data quality metrics may be used for measuring data quality for different tiers. Each tier may represent a different level of importance, which may be determined by the user. For example, tier 1 may represent a highest level of importance which may include financial data for compliance; tier 2 may represent a medium level of importance which may include daily sales data; tier 3 may represent a lowest level of importance such as human resources data for employees that may not impact daily operations. The DQAM system may utilize a data quality model to capture and store statistics for the data quality testing.

The DQAM system may also estimate of cost of data quality. Cost metrics are determined and uses to calculate the cost. Also, data quality cost forecasting may be performed to estimate costs into the future. A data quality scorecard is generated that identifies data quality costs and statistics from the data quality testing. The scorecard may comprises a report that may be viewed through a user interface or otherwise disseminated.

The DQAM system can be implemented across different industries, across different types of application and across different clients. The data quality monetization method estimates and forecasts material data quality impact on an organization which is useful for determining where to apply limited funds to maximize revenue. The DQAM system utilizes a data model to host data quality metrics and data and can generate monthly scorecard and ongoing operational daily reports. The DQAM system can be applied to full lifecycle implementations and also production runs for on-going data quality monitoring and continuous data quality improvement.

FIG. 1 illustrates a DQAM system 100. The DQAM system 100 includes an application service integration and communication layer 101, DQAM core 102 and data repository 103. The application service integration and communication layer 101 supports data collection from data sources 110. The data sources 110 may include internal systems 113 of a user and external systems 112. The layer 101 may also provide secure data communication with the internal and external systems. The layer 101 may utilize a full-featured web services library to support interaction with external systems 112 and a web portal 111 over the Internet. External systems 112 may interface with the DQAM system 100 via the layer 101 to provide data, which is loaded in the data repository 103 and analyzed for data quality. Also, data files, forms spreadsheets, etc., may be provided to the DQAM system 100 via the web portal 111. Generally, the layer 101 provides a mechanism for extracting, transforming and loading data from the data sources 110.

The layer 101 supports data collection from enterprise resources and other data sources. The layer 101 may include application program interfaces (APIs) to communicate with enterprise applications. For example, the internal systems 113 may include enterprise applications providing functions for supply chain management, accounting, customer information system (CIS), customer relationship management (CRM), etc. The layer 101 receives data from the enterprise applications, for example, through APIs or other interfaces.

The layer 101 may perform some data conversion before storing data in tables in the data repository 103. Data cleansing and correction of syntax, or conformity errors may be performed by the DQAM core 102, for example, based on rules stored in the data repository 103. These remedial operations and others may be performed as further described below. The data may be stored in tables in the data repository 103 that conform to a data model used by the DQAM system 100. The data repository 103 may include a database using the tables. In addition to the data from the data sources 110, the data repository may store any information used by the DQAM system 100.

The DQAM core 102 performs multiple functions of the DQAM system 100. The DQAM core 102 may be comprised of machine readable instructions executed by at least one processor. Modules of the DQAM core 102 and functions performed by the modules are further described with respect to FIG. 3 and may include data monitoring and testing, error handling, data quality benchmarking, cost calculation for data quality, data quality cost forecasting and scorecard generation.

Figure 2:
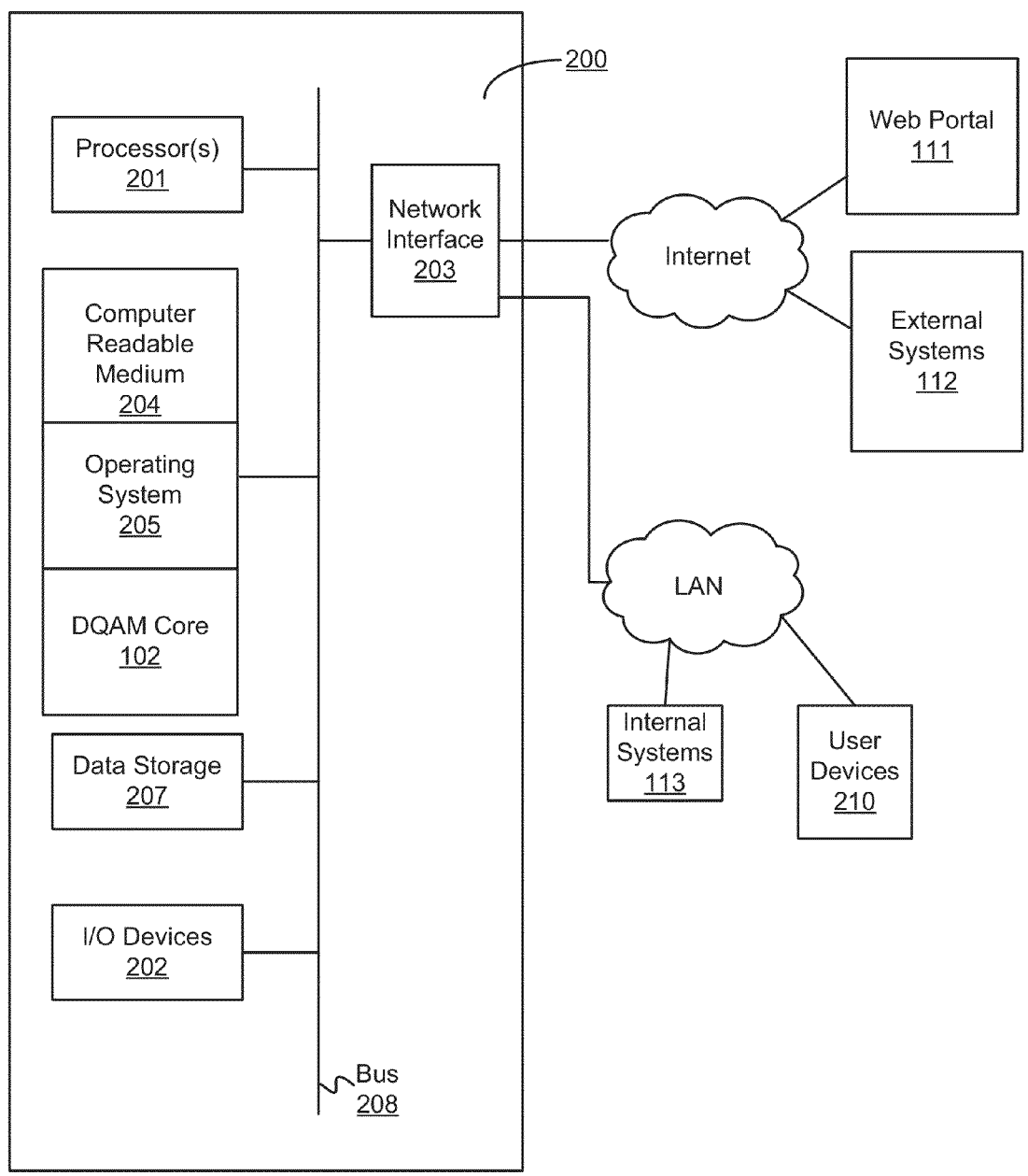
FIG. 2 illustrates a computer system that may be used for the methods and systems described herein.

FIG. 2 illustrates a computer system 200 that may be used to implement the DQAM system 100 including the DQAM core 102. The illustration of the computer system 200 is a generalized illustration and that the computer system 200 may include additional components and that some of the components described may be removed and/or modified. Also, the DQAM system 100 may be implemented in a distributed computing system, such as a cloud computer system. For example, the computer system 200 may represent a server that runs the DQAM system 100 or the computer system 200 may comprise one of multiple distributed servers that performs functions of the DQAM system 100.

The computer system 200 includes processor(s) 201, such as a central processing unit, ASIC or other type of processing circuit, input/output devices 202, such as a display, mouse keyboard, etc., a network interface 203, such as a Local Area Network (LAN), a wireless 802.11x LAN, a 3G or 4G mobile WAN or a WiMax WAN, and a computer-readable medium 204. Each of these components may be operatively coupled to a bus 208. The computer readable medium 204 may be any suitable medium which participates in providing instructions to the processor(s) 201 for execution. For example, the computer readable medium 204 may be non-transitory or non-volatile medium, such as a magnetic disk or solid-state non-volatile memory or volatile medium such as RAM. The instructions stored on the computer readable medium 204 may include machine readable instructions executed by the processor(s) 201 to perform the methods and functions of the DQAM system 100.

The DQAM system 100 may be implemented as software stored on a non-transitory computer readable medium and executed by one or more processors. During runtime, the computer readable medium 204 may store an operating system 205, such as MAC OS, MS WINDOWS, UNIX, or LINUX, and the DQAM core 102 and/or other applications. The operating system 205 may be multi-user, multiprocessing, multitasking, multithreading, real-time and the like.

The computer system 200 may include a data storage 207, which may include non-volatile data storage. The data storage 207 stores any data used by the DQAM system 100. The data storage 207 may be used for the data repository 103 shown in FIG. 1 or the computer system 200 may be connected to a database server (not shown) hosting the data repository 103.

The network interface 203 connects the computer system 200 to the internal systems 113, for example, via a LAN. End user devices 210 and other computer systems/servers may connect to the computer system 200 via the network interface 203. Also, the network interface 203 may connect the computer system 200 to the Internet. For example, the computer system 200 may connect to the web portal 111 and the external systems 112 via the network interface 203 and the Internet.

Figure 3:
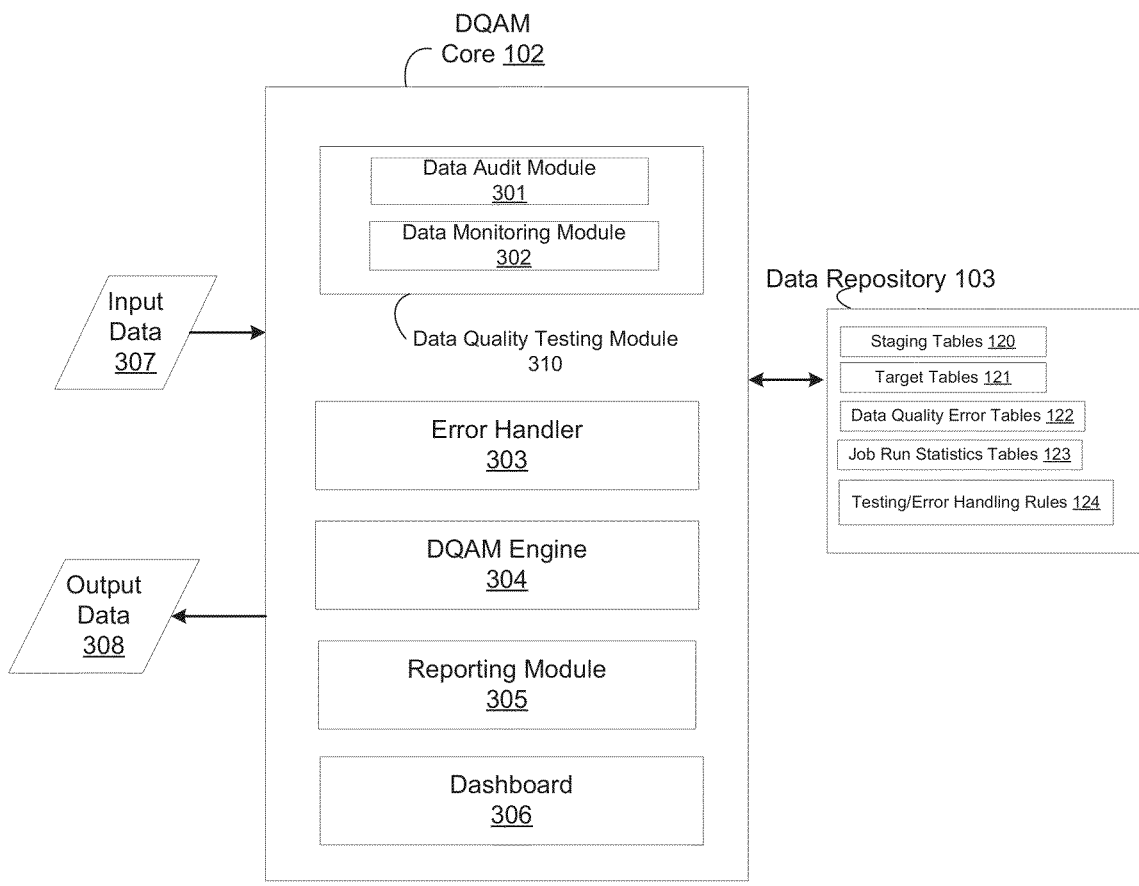
FIG. 3 illustrates modules for the data quality analysis and management system.

FIG. 3 shows an example of modules that perform the functions of the DQAM system 100. A module may comprise machine readable instructions that are executable by a processor to perform one or more functions. The modules shown in FIG. 3 may be part of the DQAM core 102 shown in FIG. 1. The modules may include a data quality testing module 310, an error handler 303, a DQAM engine 304, a reporting module 305 and a dashboard 306.

The data quality testing module 310 performs various tests described below to check the data quality of data received from the data sources 110. Examples of test categories are described in further detail below. The tests may be performed in different stages. For example, data from the data sources 110 may be loaded in staging tables 120 in the data repository 103 and data quality tests checking for completeness and conformity and consistency are performed. Data may be cleansed and loaded into target tables 121 in the data repository 103 and additional tests are executed, which may check for consistency, integrity and duplicity. Different error handling may be performed by the error handler 303 at various stages.

In one embodiment, the data quality testing module 310 includes a data audit module 301 and a data monitoring module 302. The data audit module 301 may perform data profiling, auditing and cleansing. Data profiling and auditing determines the structure and integrity of data provided by the data sources 110. The data profiling and auditing obtains a current assessment of data quality by creating measures to detect data defects as they enter the DQAM system 100, and identifies data dependencies so business rules and action steps can be developed to fix the data prior to loading into the data repository 103. The data audit module 301 may audit the data to initially identify root problems with the data so the root problems can be corrected, for example, at the data source. Then data monitoring may be performed by the monitoring module 302 to address additional errors.

Factors used for the data profiling and auditing include one or more of accuracy, completeness, conformity, consistency, integrity, and duplication. One or more of these factors may be considered for data monitoring performed by the data monitoring module 302. Different data tests are implemented by the data audit module 301 and/or the data monitoring module 302 to check these factors.

Accuracy determines what data is incorrect or out of date. In one example, data received from a data source includes a plurality of records with different fields. Rules may be stored to identify whether a data value in a field is out of range or incorrect. Other rules may be applied for other fields. Completeness determines what data is missing or unusable. A null field in a record may indicate incomplete data for a required field. Completeness rules may be stored and implemented and may be assigned to different levels. The levels may include mandatory attributes, such as social security number for a bank account, that require a value, optional attributes, such as event date for an event with a 'scheduled' status, with which may have a value based on some set of conditions, and inapplicable attributes, such as maiden name for a single male, which may not have a value. Completeness may be measured in two ways, such as analyzing whether every record that should be stored is stored, and verifying that all information pertaining to a record is present.

Conformity determines what data is stored in a non-standard format. For example, conformity data quality tests check for adherence to a type, precision, format patterns, domain ranges and constraint properties of the data. Some data values and formats may be standardized across all the data sources 110 and the tests check whether the data conforms to these global standards. For example, the tests check if data conformation to standard data types for name, phone, address, unit of measures etc. Consistency determines what data values give conflicting information. Integrity determines what data is missing or not referenced. Duplication determines what data records or attributes are repeated. The tests may determine that records are not duplicated based on key fields. Duplication and integrity checks may also be implemented by execution of business rules.

Examples of the tests that may be performed for the factors described include domain checking, range checking and basic statistics, cross field verification, data format verification to determine whether data conforms to predetermined format, reference field consolidation, referential integrity, duplicate identification (e.g., are there users with same social security number), uniqueness and missing value validation, key identification, and data rule compliance. Domain checking tests for allowable values, such as whether gender of M or F. Range checking and basic statistics determine whether values are within predetermined ranges or other statistic checks, such as whether birth date is later than current year. For cross field verification, for example, if a customer consolidates loans, the test determines whether that customer is associated with each loan record. For referential integrity, for example, if a customer has an account identified in Table X then the test check if that account is found in a Master Account Table. For uniqueness and missing value validation, for example, if values for a record are supposed to be unique, such as customer identifier, the test determines if they are re-used. Uniqueness applies for primary keys in a table. For example, if a data source is loading data into a database table in the DQAM system 100, the values for a primary key in the table should be unique for each record. For key identification, if there is a defined primary key/foreign key relationship across tables in the DQAM system 100, validate it by looking for records that do not have a parent. Data rule compliance determines compliance with stored rules. For example, if a closed customer loan must have a balance of zero, the test check if there are not records marked closed with a loan balance greater than zero.

The outcome of the tests performed by the data audit module 301 may identify various errors, such as ages out of range (e.g., 185 years old), addresses not conforming to predetermined formats (e.g., ST instead of street), invalid values, missing values (e.g., record contains a null value for a field but a value is required, such as for customer ID), different cultural rules for data formats, etc. The reporting module 305 may generate reports of the errors and the error handler 303 may cleanse the data of the errors. Data cleansing performed by the error handler 303 may include including default values for null fields that need to be populated, correcting formatting, etc. Also, metrics are evaluated to continuously assess the quality of the data.

The data monitoring module 302 executes tests to evaluate the quality of data (e.g., input data 307) from the data sources 110. The data monitoring is an on-going process to test the quality of data as it is received. The data monitoring module 302 may track and log data quality issues. Different tests may be performed for different types of data. Rules for testing and error handling 124 may be stored in the data repository 103. Reports of the monitoring and testing performed by the data monitoring module 302 may be generated by the reporting module 305. Examples of information that may be included in the reports includes the quality of data supplied by each client or project. This information can be represented by the number of data quality test failures that have occurred for a particular batch of data or data source or client and the percentage of data that is of good quality. The reports may indicate the number and breakdown of the errors by type and/or severity. Commonly repeated errors may be indicated and the number of times repeated erroneous records occurred.

Figure 4:
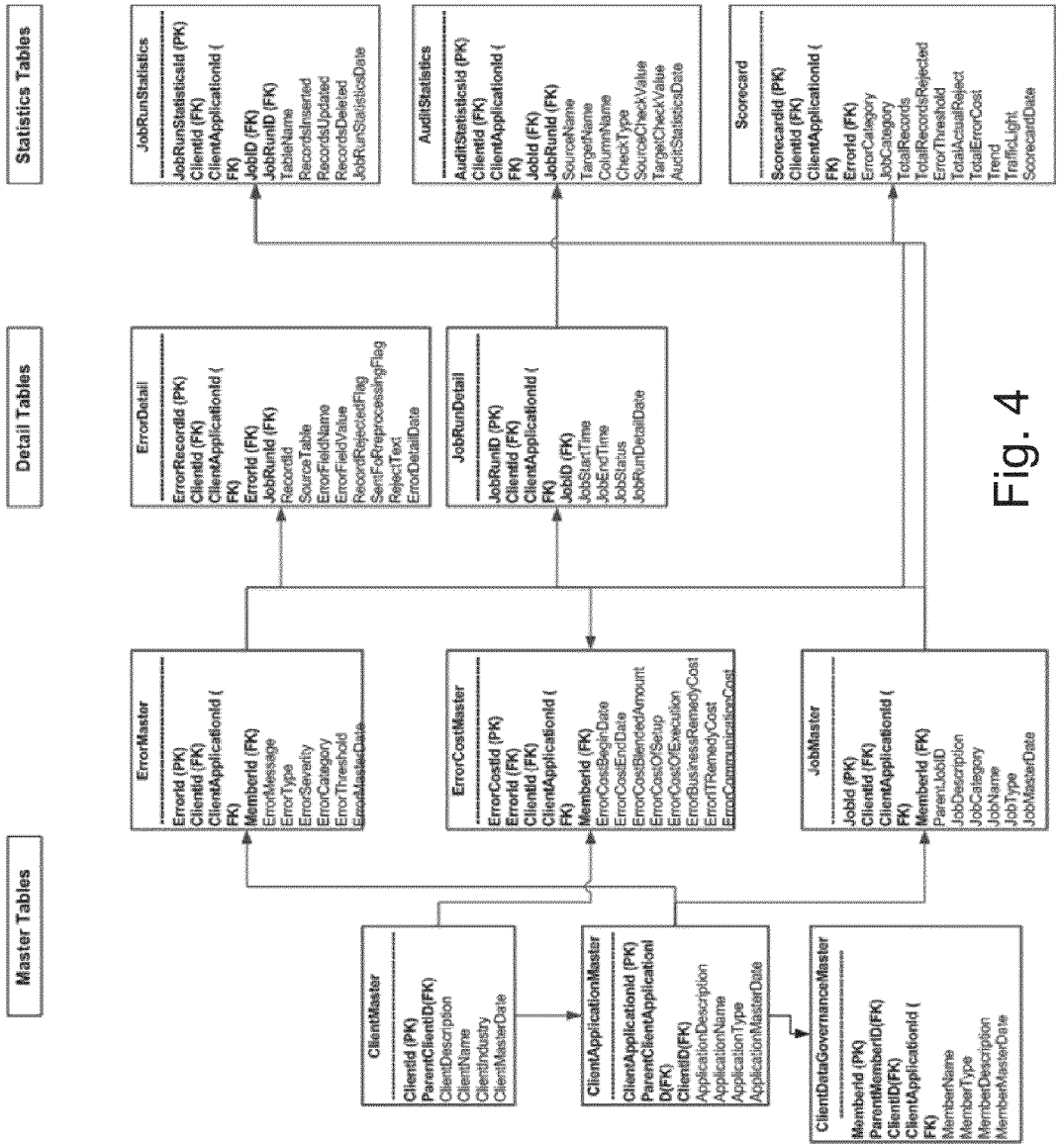
FIG. 4 illustrates a data model.

Tables may be stored in the data repository 103 for logging information about the data quality auditing and monitoring and errors detected by the data audit module 101 and/or the data monitoring module 102. Examples of a data model showing the schema of tables are shown in FIG. 4. The tables may include master tables for data sources/clients, jobs, and errors. Detail tables describing details for errors and jobs. Statistics tables include statistics on job runs, auditing and scorecard metrics. The tables may be populated by the DQAM core 102. These tables are represented by the tables shown in FIG. 3 as data quality error tables 122 and job run statistics tables 123. Also, tables may be used to store the tested data. Data quality testing may be performed in different stages. In an embodiment, certain tests are performed in a first stage where data is tested, cleansed and loaded into staging tables 120. Other tests may be performed when the data is in the staging tables 120 and then the data is loaded into the target tables 121. The staging tables 120 may be in a data storage other than the data repository 103.

Referring to FIG. 4, in one example, an error mater table of the data quality error tables 122 may include fields for error ID (e.g., assigned by the module 101/102), error message related to failed test (e.g., invalid date received), error type, error severity. Error types may include informational, warning, error, severe error and abnormal end of job. A warning may indicate that a potential error condition exists, such as a default value added for a null field. Another type may indicate an error was detected and an automatic recovery procedure was performed. Another type may indicate that the detected error was too severe for automatic recovery, and abnormal end of job may indicate a processing step prematurely failed or failed to start.

The error table may identify categories for the errors. The categories may be associated with the factors and tests described above. Examples of categories may include Completeness—Summary Validation, Completeness—Record Count, Completeness—Mandatory, Completeness—Optional Completeness—Inapplicable Conformity—Type Conformity—Precision Conformity—Domain Range Conformity—Constraint Referential Integrity—Foreign Key Referential Integrity—Primary Key Custom Metric. Additional fields in the error table may include error threshold and an error date.

Referring back to FIG. 3, the error handler 303 performs remedial operations if errors are detected from in the input data 307 by the data quality testing module 310. Error handling may include determining the error severity level, such as fatal, hard or soft, of detected data quality errors and performing different actions depending on the severity level. Examples of actions may include logging an error, halting operation, rolling back data input, sending notifications of errors, etc.

The DQAM engine 304 compares data quality metrics determined from the testing performed by the data quality testing module 310 to benchmarks. The DQAM engine 304 may populate information in one or more of the tables shown in FIG. 4.

The DQAM engine 304 also calculates data quality costs and forecasts data quality costs. Data quality cost includes factors for determining operating costs and assurance costs. Operating costs include costs for prevention, appraisal, and failure costs. Assurance costs includes costs related to the demonstration and proof required by customers and management.

Figure 5:
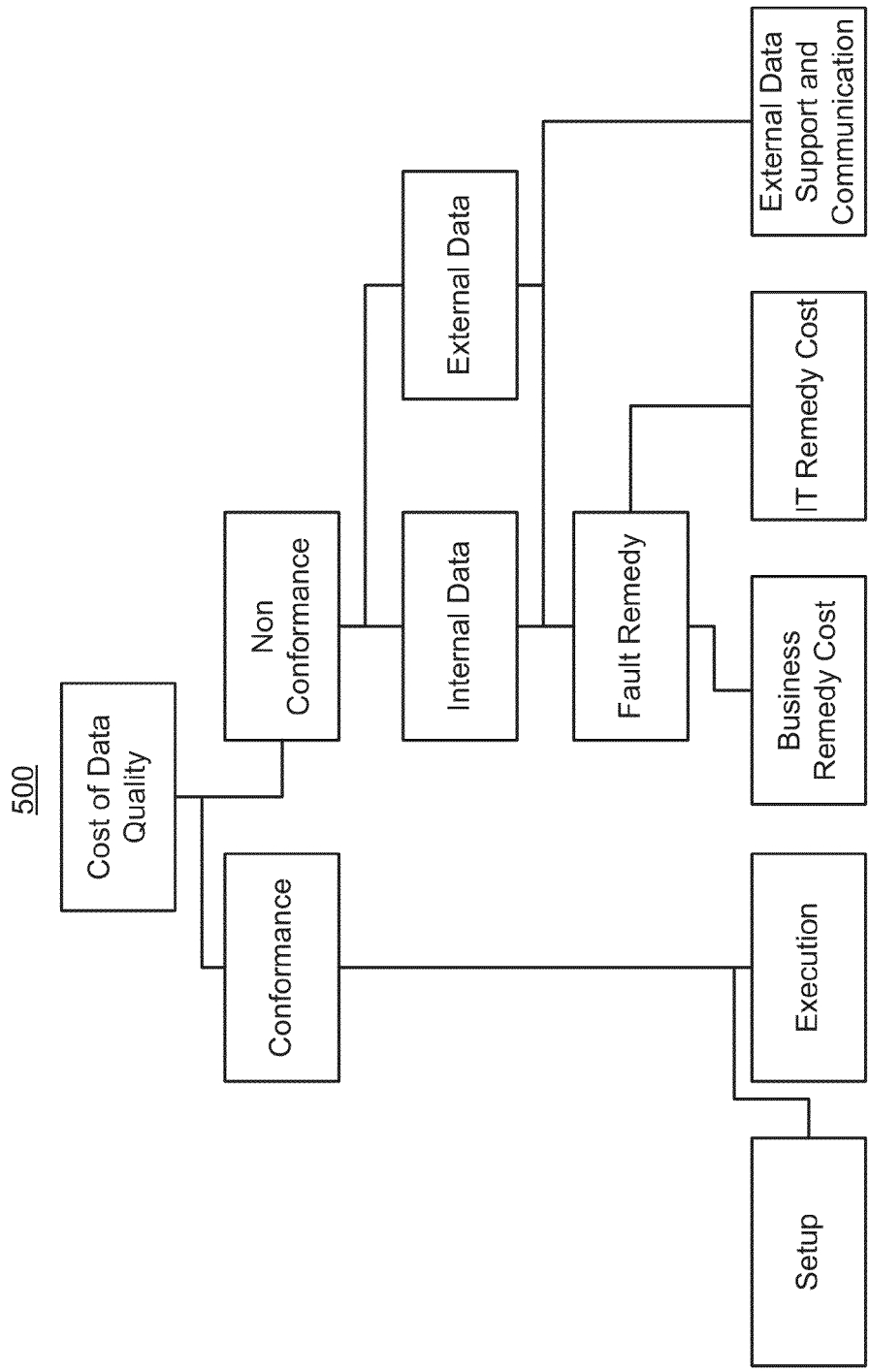
FIG. 5 illustrates a decision tree.

FIG. 5 illustrates a decision tree 500 for determining the cost of data quality. The decision tree 500 includes branch for conformance and a branch for non-conformance. Costs for determining whether data conforms to requirements include setup and execution costs. The costs in the decision tree may be calculated by the DQAM engine 304.

Setup cost is the cost of design to deploy data quality validation and detection. This may include the cost to design tests performed by the data audit module 301 and the data monitoring module 302 and the cost for other design actions performed to implement the data quality validation and detection performed by the DQAM system 100. The execution cost may include the cost of executing data quality operations, monitoring, and reporting.

The costs for the non-conformance branch may include a business remedy cost and an information technology (IT) remedy cost. These costs may be incurred if the data that is non-conforming is generated from internal systems 113 or from external systems 112 (which may be systems in a data source), and if there is are remedial actions that can be taken. The business remedy cost may include business costs associated with remediating data quality errors. The business remedy cost may be a cost of false insight+a cost of root cause analysis. IT and business may have false assumptions concerning data content and its quality. The cause of false insight is the cost of operating with data errors, which may cause a reduction in revenue. The cost of root cause analysis may include the business costs of identifying root causes of data errors. The IT remedy cost is the IT costs for fixing data quality. An external data support and communication cost may include third party data error reporting, feedback, and follow-up costs. Costs may include costs determined from number of man hours to perform actions related to the costs.

The DQAM engine 103 may also utilize other factors when calculating the cost of data quality. For example, time of detection is used. Time of detection is a cost factor related to length of time to detect errors. For example, business and IT remedy costs increase by a cost factor of 20% exponentially per additional period required for detection. Also, data quality cost prediction may be based on severity of the data errors.

FIG. 6 illustrates an equation that the DQAM engine 304 may use to calculate the cost of data quality. The cost of data quality is equal to the cost of conformance and the cost of non-conformance as shown in 601. The costs of conformance and nonconformance are further broken down in 602. For example, the cost of data quality is equal to ((cost of setup+cost of execution)+(internal data cost+external data cost)). The internal data cost may be the (business remedy cost+IT remedy cost), and the external data cost may be (business remedy cost+IT remedy cost+external data support and communication cost). The cost of setup, cost of execution, business remedy cost, IT remedy cost, and external data support and communication cost may be determined based on many factors including test results for data quality tests performed by during an audit phase by the data audit module 301. For example, if the data quality errors are more frequent, diverse and severe, than cost estimates may be higher. A user may also enter or modify cost estimates for the costs.

FIG. 7 shows examples of costs for different tiers. The costs are shown in terms of man hours. The costs may be converted to monetary values by multiplying each man hour by a rate. The DQAM system 100 may prioritize data into different tiers according to importance to the user. Each tier may represent a different level of importance, which may be determined by the user. For example, tier 1 may represent a highest level of importance which may include financial data for compliance; tier 2 may represent a medium level of importance which may include daily sales data; tier 3 may represent a lowest level of importance such as human resources data for employees that may not impact daily operations.

Also, the data quality cost may be calculated in terms of number of incidents. For example, assume a data quality cost is to be calculated for tier 3, and the data quality errors are for external data. The cost of data quality is calculated as follows: (Cost of Setup (60)+Cost of Execution (8))+# of Incidents (2)×External Data (Business Remedy Cost (60)+IT Remedy Cost (8)+External Data Support and Communication (60))= 324 man hours.

The reporting module 305 shown in FIG. 3 generates a data quality scorecard, which may include the statistics determined by the calculations performed by the DQAM engine 304. Many different types of reports providing different views (e.g., views by region, by product, by phase, etc.) of the data quality results. The dashboard 306 may comprise a graphic user interface for users to interface with the DQAM system 100. The users may enter data into the DQAM system 100 and view reports and other information via the dashboard 306. Output data 308 for example is data quality scorecard or other reports or information generated by the DQAM system 100. Although not shown, input data 307 and output data 308 may be communicated via layer 101 shown in FIG. 1.

FIG. 8 shows an example of a data quality scorecard 800 that may be generated by the DQAM system 100. The scorecard 800 includes statistics for the data quality monitoring. The statistics may be shown by application or capability. Different views of the statistics may be generated and shown for example via the dashboard 306. The scorecard may include a color-coded traffic light, such as green, yellow, red to provide a general indication of the data quality for each application. Severities are indicated for different test categories and a data quality cost is shown for each application. Other statistics are also shown.

Figure 9:
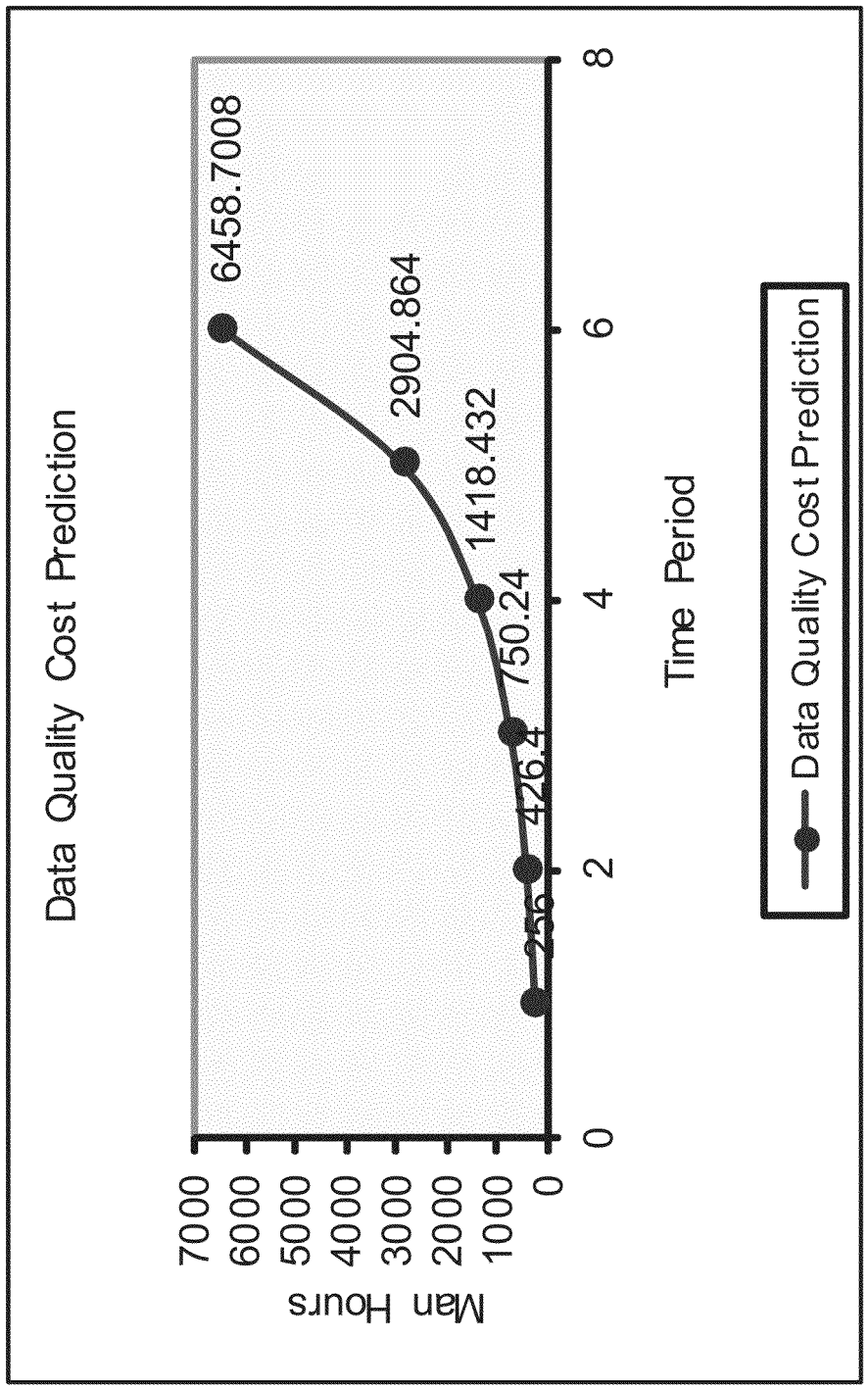
FIG. 9 illustrates a data quality forecast.

FIG. 9 shows an example of a data quality forecast that may be determined by the DQAM engine 304 and shown in a report. The forecast shows the data quality cost increasing over time if not remedied. For example, a cost increase factor per time period may be multiplied by business and IT remedy costs for each period of time for forecasting. Also, data quality cost prediction may be based on severity of the data errors.

Figure 10:
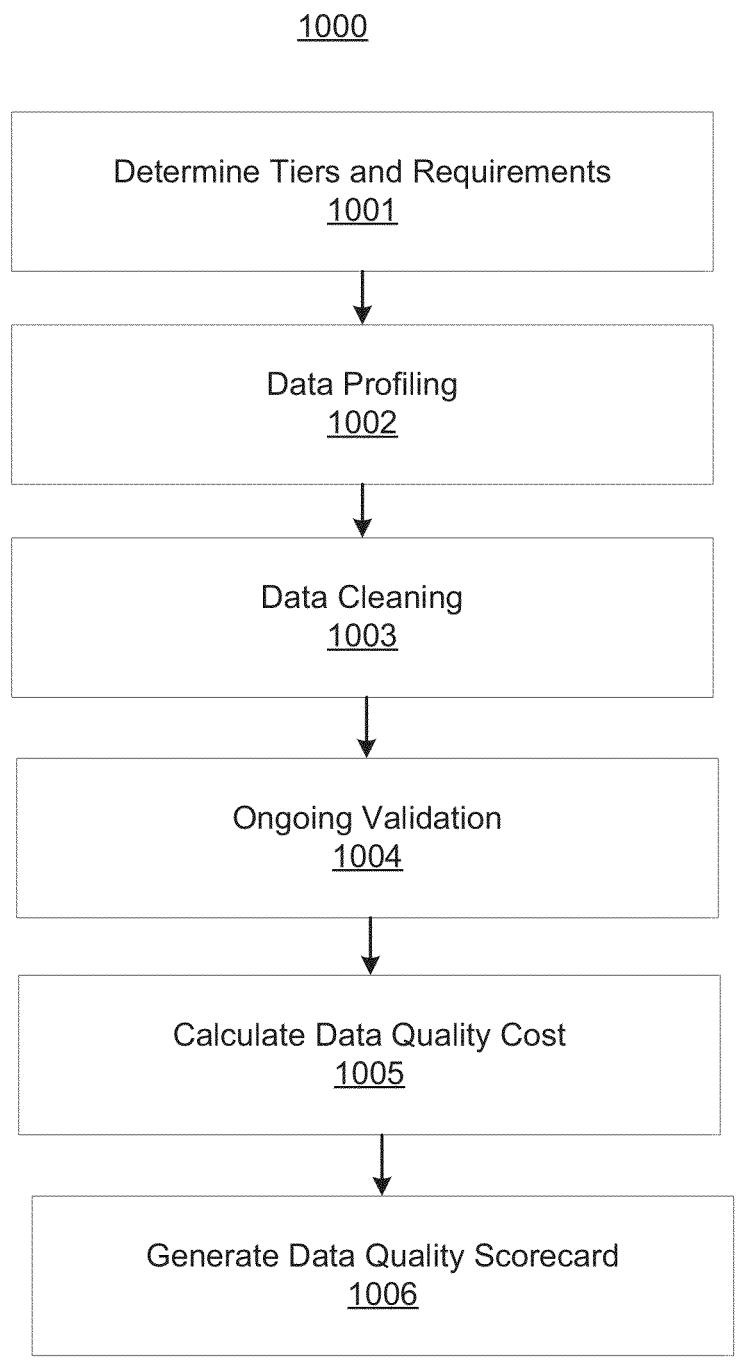
FIGS. 10-12 illustrate methods.

FIG. 10 illustrates a flow chart of a method 1000 for data quality analysis and management. The method 1000 and other methods described below are described with respect to the DQAM system 100 shown in FIGS. 1-3 by way of example. The methods may be performed by other systems.

At 1001, the DQAM system 100 determines tiers and requirements for the data quality analysis and management. The tiers and types of data classified for each tier and requirements for each tier may be stored in the data repository 103. The DQAM system 100 may classify data to be tested and used for a user's applications according to different tiers. Examples of different applications for which the data may be used may include supply chain, retail, inventory control, accounting, etc. Also, examples of data costs for different tiers are shown in FIG. 7. Data for different information is classified into each tier. In one example, data for different subject matters is classified into different tiers. A user may determine which data is classified into each tier. Different business and technical requirements may be determined for each tier. Also, data quality error thresholds may be determined according to the tiers. Also, different business risks may be determined for each tier and may be used to estimate costs for the cost of data quality.

At 1002, the DQAM system 100 performs data profiling. Data profiling may include sampling data and measuring and testing data quality according to the tiers. Profiling may indicate whether there is compliance with the business and technical requirements determined at 1001. Profiling may be used to identify the current problems with data quality from different sources. In one example, the data audit module 301 performs the profiling.

At 1003, the DQAM system 100 performs data cleansing based on the profiling. The cleansing may include reporting anomalies and errors detected by the profiling, error correction, etc. The cleansing may include the remedial operations performed by the error handler 303.

At 1004, the DQAM system 100 performs ongoing validation. This may include continued implementation of data quality tests on the data received from the data sources 110. Ongoing validation may be performed by the data monitoring module 302 and may include operations performed by the error handler 303 including implementing proactive measures to correct errors. Also, the validation may identify data sources providing insufficient data quality for example by identifying repeated errors. Controls may then be implemented on the data from that source. This may include correcting the data to comply with business and technical requirements, such as correcting improper data syntax. Rules may be stored in the data repository 103 to be executed to correct the data, such as correcting a date format in a particular field from a particular source.

At 1005, the data quality cost is calculated, such as described with respect to FIG. 6. The data quality cost may be determined from the cost of setup, the cost of execution, internal data costs and external data costs. Forecasting for data quality cost may also be performed. Additionally, the data quality cost may be adjusted overtime as ongoing testing, validation and remediation is performed on the data received from the data sources 110. As non-conformance diminishes, data quality cost may decrease. Trends may also be determined for the data quality cost. The DQAM engine 304 may determine the data quality cost, trends, forecasts and other statistics. At 1006, the reporting module 305 may generate the data quality scorecard and other reports, and this information may be presented via the dashboard 306.

Figure 11:
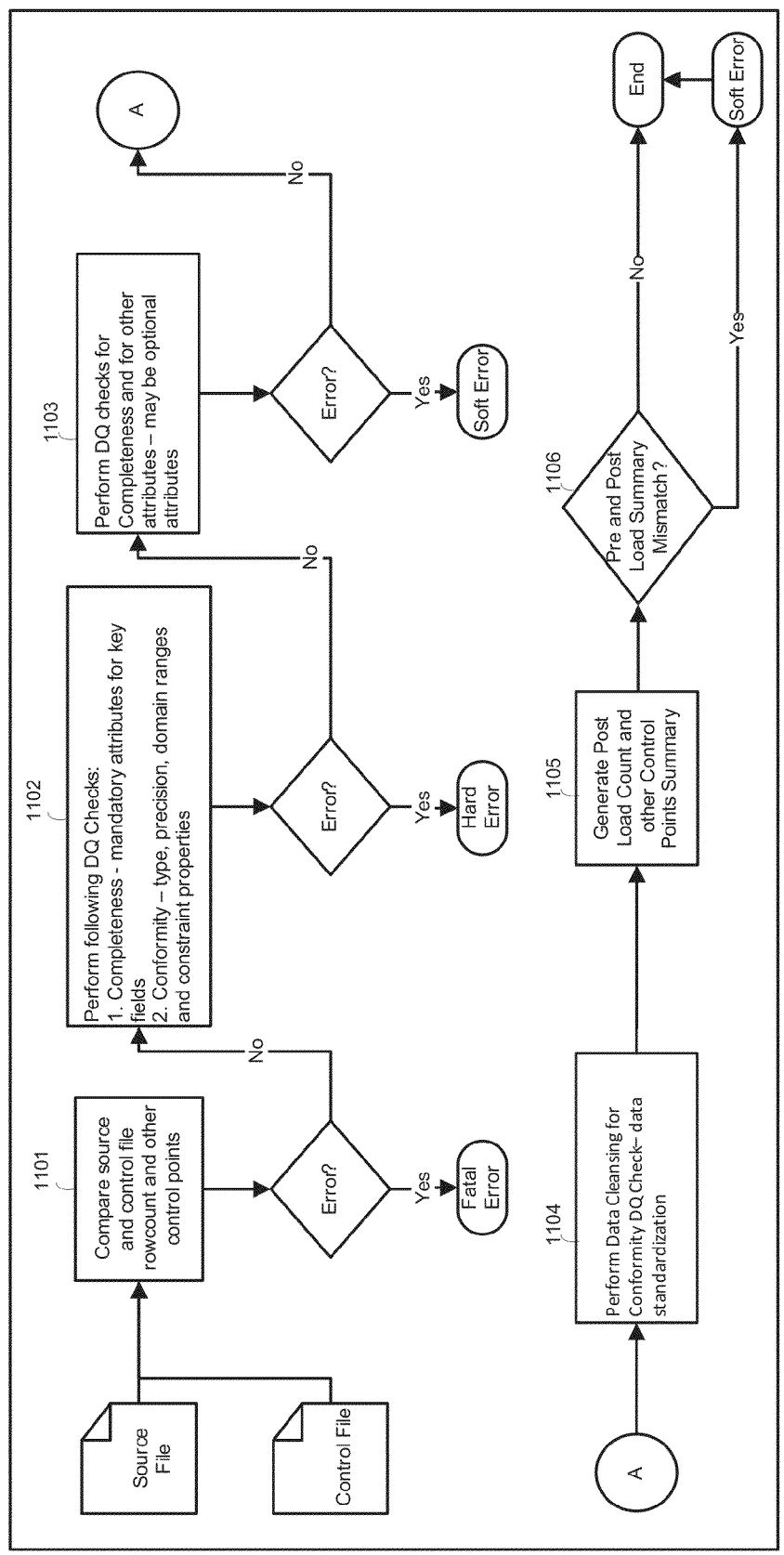
Figure 12:
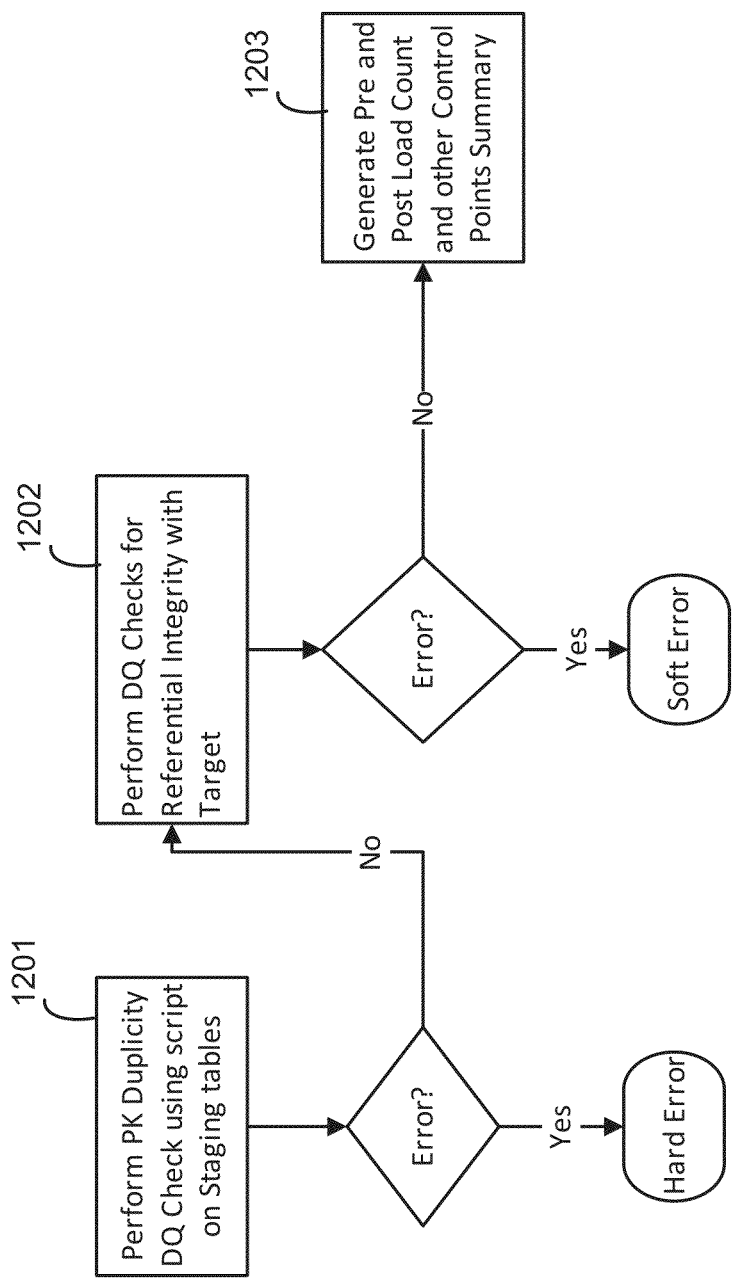

FIGS. 11 and 12 show methods 1100 and 1200 for performing data quality testing. Steps from the method 1100 may be performed for data profiling, data cleansing and ongoing validation described in the method 1000.

At 1101, a source file and a control file are compared. If a mismatch error occurs, the error may be considered a fatal error and data process may be aborted and remedial operations for error resolution may be performed. The source file may be a file containing records from one of the data sources 110. Data quality tests are to be executed on the records. The control file may include a file that has already been checked for row count (e.g., number of records) and other control points. The source file should contain the same number of records as the control file. If there is a mismatch, then there may be a problem with the data source. If a control file is not available, this step may be omitted.

At 1102, the records in the source file are tested for completeness of mandatory attributes for key fields and conformity to type, precision, range and any other constraint properties. Mandatory attributes may include attributes such as customer ID, social security number, etc. A key field may be a primary key or a foreign key in a data model schema. Conformity may include determining whether data in a field is of a correct data type, is within a predetermined range, etc. If a data quality test for completeness of mandatory attributes for key fields or conformity fails, then the data quality error is considered a hard error. Successful records move to the next step. Unsuccessful records may be marked or other error handling operations are performed and processing may continue.

At 1103, records in the source file are tested for completeness of other attributes. These may include attributes that are optional, such as gender or middle name. Records that fail are considered a soft error. Successful records may be loaded into one of the staging tables 120.

At 1104, data in the staging table is tested for conformity and the data may be cleansed to correct conformity errors.

At 1105, a post staging table load summary is generated for row count and other control points for records loaded into the staging table. Information in the load summary may be compared to control data if available and soft error operations may be performed, such as generating an alert via email or other communication technique to investigate any detected issues.

Steps shown in FIG. 12 may be performed after 1105. In FIG. 12, at 1201, data in the staging table is tested for duplicity, for example, using scripts on the staging table. All duplicate records that fail the test may be rejected. Successful records continue to the next step for testing.

At 1202, the data is tested for referential integrity. Testing for referential integrity may include determining whether records include foreign keys or other attributes that are referred to by other tables in a database. Records that fail may be marked as errors (soft error). Successful records are loaded into a target table of the target tables 121.

At 1203, a post staging load summary is generated for row counts and other control points for records loaded into the target table. Errors encountered during loading or identified from the summary may be considered soft errors.

Figure 13A:
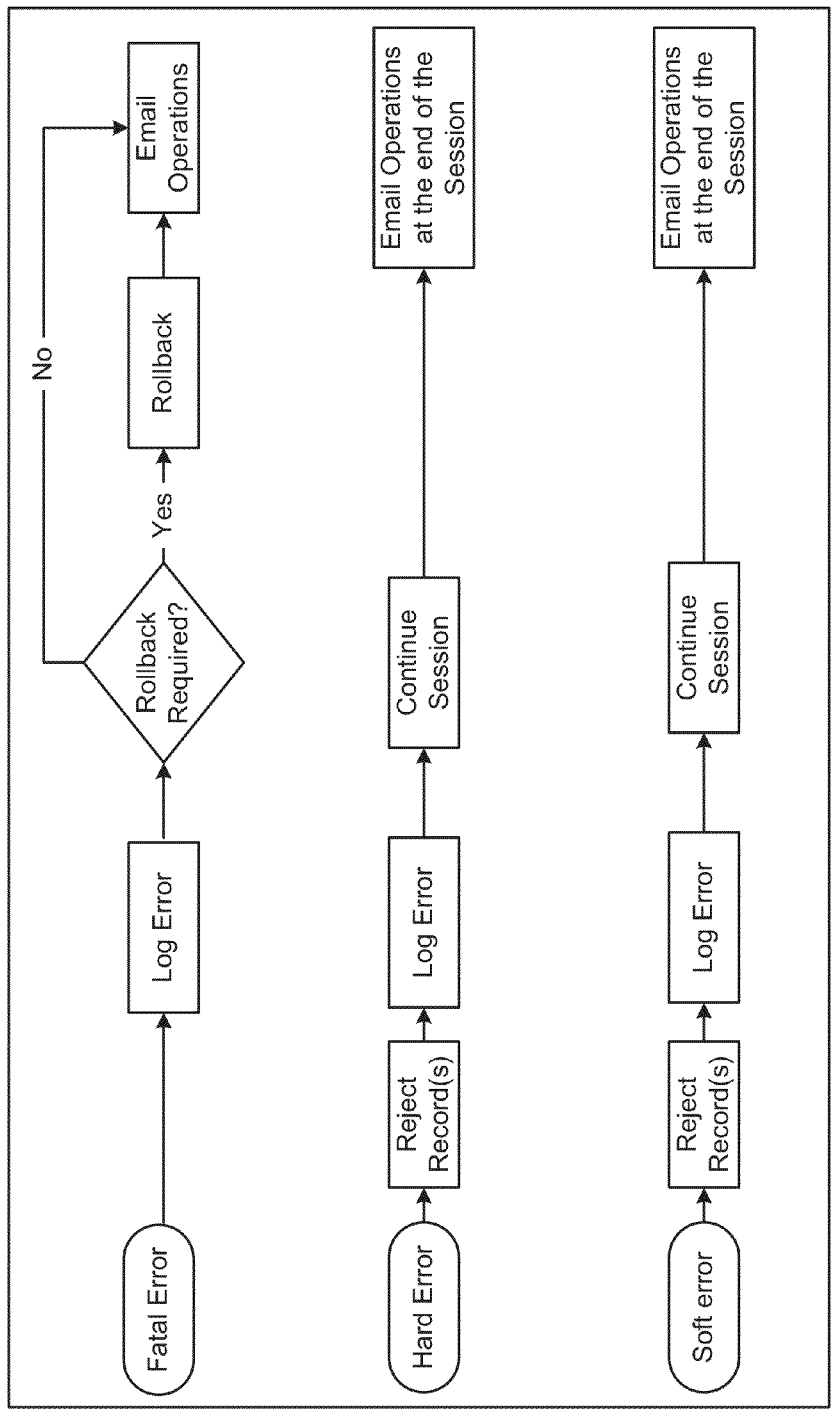
FIG. 13A illustrates data quality error levels and remedial operations.

FIG. 13A illustrates examples of remedial operations that may be performed, for example, by the error handler 303 depending on the severity level of the data quality error. Severity levels are shown as fatal, hard and soft and FIGS. 11 and 12 show examples when different severity levels are identified and their remedial operations are triggered. For example, a fatal error may include a negative value for sales data. In this case, a rollback may be performed and an email notification may be sent to operations. A hard error example may include identifying one bad sales data and parking or flagging the data. A soft error may include an old address for an employee in human resources data. As shown, examples of remedial operations may include logging errors, rejecting records, marking records, continuation of data processing or halting of data processing.

FIG. 13B shows examples of different actions that can be performed by the DQAM system 100 based on severity level. For example, no. 1 represents a referential integrity error on a primary key, such as a transaction ID column in a database. If there is a problem with a primary key, such as two transactions with the same transaction ID, then the records may be rejected and notifications are sent. Other examples of actions are also shown for different error types. These examples may be representative of technical requirements for transactions stored in a database. Multiple actions may be taken per error detected.

While the embodiments have been described with reference to examples, those skilled in the art will be able to make various modifications to the described embodiments without departing from the scope of the claimed embodiments.

What is claimed is:

1. A data quality analysis and management system comprising:
   a processor;
   an application service integration and communication interface to interface with internal and external systems to receive data;
   a data quality testing module, executed by the processor, to perform data quality tests on the received data and to determine data quality statistics from the execution of the data quality tests, wherein the data quality tests include completeness, conformity, consistency, integrity and duplicity tests;
   an error handler to execute remedial operations in response to data quality errors detected by the data quality testing module,
   wherein the data quality testing module executes the completeness and the conformity tests in a first stage of data quality testing and the error handler performs data cleansing based at least on the conformity test, and
   the data quality testing module executes the consistency, the integrity and the duplicity tests on the cleansed data in a second stage;
   a data quality analysis and management engine to determine data quality cost metrics including cost of setup, cost of execution, internal data cost, and external data cost, and calculate a cost of data quality from the data quality cost metrics; and
   a reporting module to generate a data quality scorecard including statistics determined from execution of the data quality tests by the data quality testing module and the cost of data quality determined by the data quality analysis and management engine.

2. The system of claim 1, wherein the cost of data quality calculated by the data quality analysis and management engine equals ((cost of setup+cost of execution)+(internal data cost+external data cost)), wherein the internal data cost equals (business remedy cost+information technology remedy cost), and the external data cost equals (the business remedy cost+the information technology remedy cost+external data support and communication cost).

3. The system of claim 2, wherein the cost of data quality is calculated as a function of a number of data quality errors detected by the data quality tests.

4. The system of claim 1, wherein the data quality scorecard, for different data sources or for different applications or for different categories of capabilities, indicates severity levels of data quality errors detected in response to the execution of the data quality tests, a total of successful records of the received data, a rejection percentage, a benchmark comparison for data quality error rate, and a trend indicator to indicate, for each of the data quality tests for which data quality errors were detected, whether the data quality errors are increasing or decreasing.

5. The system of claim 1, wherein the data quality analysis and management engine determines a forecast of data quality cost over time as a function of a cost increase factor per time period and severity of data errors detected by the data quality tests.

6. The system of claim 1, wherein the error handler determines different severity levels of data quality errors detected in response to the execution of the data quality tests, and different ones of the remedial operations are executed based on the different severity levels.

7. The system of claim 6, wherein the different severity levels comprise a fatal error, a hard error and a soft error, wherein error logging, rollback and reporting are the remedial operations for the fatal error, and rejecting a record in the received data, error logging, and reporting are the remedial operations for the hard error, and marking the record as an error, error logging, and reporting are the remedial operations for the soft error.

8. The system of claim 7, wherein a session of data processing on the received data is continued if a data quality error having a hard error or soft error is detected and the session is discontinued if a data quality error having a fatal error is detected.

9. The system of claim 1, in the first stage, the data quality testing module executes the completeness test on mandatory attributes in key fields in a record of the received data and executes the conformity test on the record,
wherein if a data quality error is detected in response to the execution of the completeness test on the mandatory attributes of the record or the conformity test on the record, the error handler performs at least one of the remedial operations related to a hard error severity level, and if no data quality error is detected, the quality testing module executes the completeness test on other attributes of the record.

10. The system of claim 9, wherein if a data quality error is detected in response to the execution of the completeness test on the other attributes of the record, the error handler performs at least one of the remedial operations related to a soft error severity level.

11. The system of claim 10, in the second stage, if the record has not been previously rejected based on the execution of the completeness and conformity tests, the data quality testing module executes the duplicity test on the record,
wherein if a data quality error is detected in response to the execution of the duplicity test, the error handler performs the at least one of the remedial operations related to the hard error severity level, and if no data quality error is detected, the data quality testing module executes the integrity test on the record.

12. The system of claim 11, wherein if a data quality error is detected in response to the execution of the integrity test on the record, the error handler performs the at least one of the remedial operation related to the soft error severity level on the record.

13. The system of claim 1, wherein in the first stage, the cleansed data is loaded into a staging table, and in the second stage, the data quality testing module executes the consistency, integrity and duplicity tests on the cleansed data in the staging table, and wherein the error handler performs at least one of the remedial operations on the data in the staging table in response to data quality errors detected in the second stage, and the data is subsequently loaded into a target table.

14. A non-transitory computer readable medium including machine readable instructions that are executed by at least one processor to:

receive data comprising a plurality of records from a data source via an application service integration and communication interface;
execute data quality tests on the received data and to determine data quality statistics from the execution of the data quality tests, wherein the data quality tests include completeness, conformity, consistency, integrity and duplicity tests, wherein the execution of the data quality tests includes executing the completeness and the conformity tests in a first stage and perform data cleansing based at least on the conformity test, and executing the consistency, the integrity and the duplicity tests on the cleansed data in a second stage and load the records;
determine data quality cost metrics including cost of setup, cost of execution, internal data cost, and external data cost;
calculate a cost of data quality from the data quality cost metrics; and
generate a data quality scorecard including statistics determined from execution of the data quality tests and the cost of data quality.

15. The non-transitory computer readable medium of claim 14, wherein the cost of data quality calculated by the data quality analysis and management engine equals ((cost of setup+cost of execution)+(internal data cost+external data cost)), wherein the internal data cost equals (business remedy cost+information technology remedy cost), and the external data cost equals (the business remedy cost+the information technology remedy cost+external data support and communication cost).

16. The non-transitory computer readable medium of claim 14, wherein the cost of data quality is calculated as a function of a number of data quality errors detected by the data quality tests.

17. The non-transitory computer readable medium of claim 14, wherein the machine readable instructions to execute the data quality tests in the first stage comprise instructions to:
execute the completeness test on mandatory attributes in key fields in a record of the records and execute the conformity test on the record,
wherein if a data quality error is detected in response to the execution of the completeness test on the mandatory attributes of the record or the conformity test on the record, perform at least one of the remedial operations related to a hard error severity level, and if no data quality error is detected, execute the completeness test on other attributes of the record, and
load the record to a staging table in a data repository.

18. The non-transitory computer readable medium of claim 14, wherein the machine readable instructions to execute the data quality tests in the second stage comprise instructions to:
execute the duplicity test on the record, wherein if a data quality error is detected in response to the execution of the duplicity test, perform at least one remedial operation related to the hard error severity level, and if no data quality error is detected, execute the integrity test on the record, and
if a data quality error is detected in response to the execution of the integrity test on the record, perform at least one remedial operation related to a soft error severity level on the record, and if a data quality error is not detected in response to the execution of the integrity test on the record, load the record into a target table in the data repository.

19. A method of performing data quality analysis and management comprising:
- executing, by a processor, data quality tests on records received from a plurality data sources, wherein the data quality tests include completeness, conformity, consistency, integrity and duplicity tests, and wherein the execution of the data quality tests includes executing the completeness and the conformity tests in a first stage and performing data cleansing based at least on the conformity test, and executing the consistency, the integrity and the duplicity tests on the cleansed data in a second stage and loading the records in a database table;
- determining data quality cost metrics including cost of setup, cost of execution, internal data cost, and external data cost;
- calculating a cost of data quality from the data quality cost metrics, wherein the cost of data quality calculated by the data quality analysis and management engine equals ((cost of setup+cost of execution)+(internal data cost+external data cost)), wherein the internal data cost equals (business remedy cost+information technology remedy cost), and the external data cost equals (the business remedy cost+the information technology remedy cost+external data support and communication cost); and
- generating a data quality scorecard including statistics determined from execution of the data quality tests and the cost of data quality.

20. The method of claim 19, comprising:
- determining different severity levels of data quality errors detected in response to the execution of the data quality tests, and different remedial operations are executed based on the different severity levels.

* * * * *